United States Patent Office 3,357,719
Patented Dec. 12, 1967

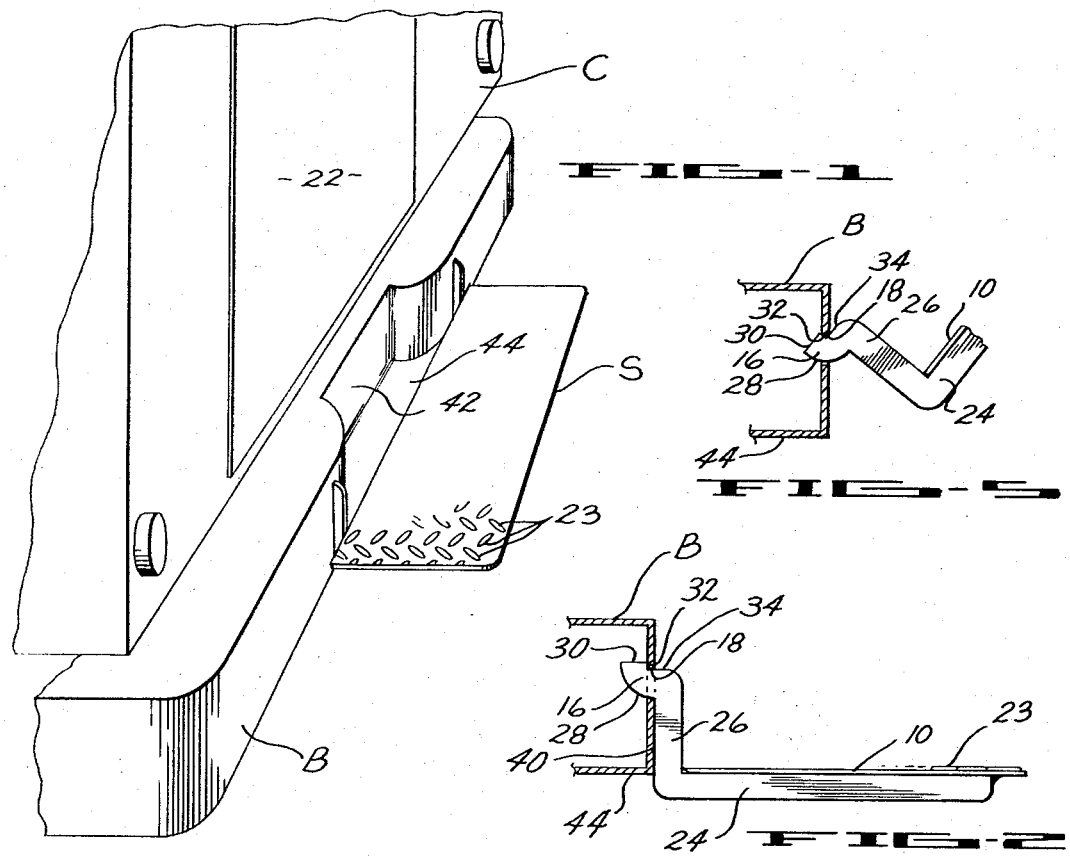
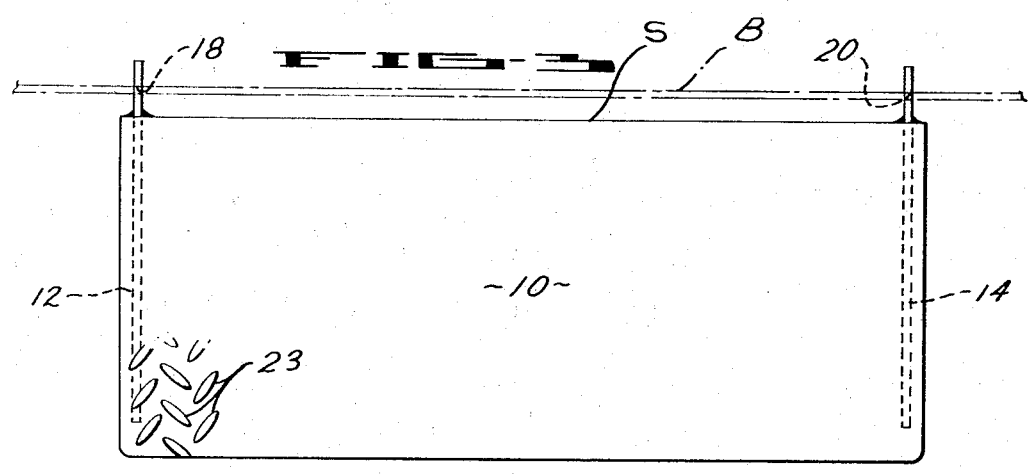
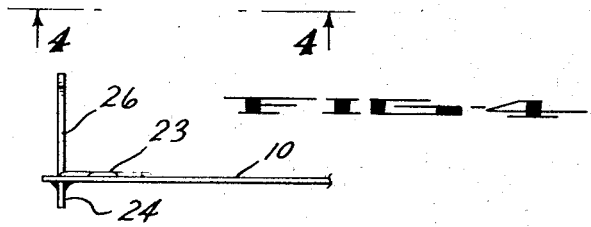

3,357,719
REMOVABLE STEP FOR A TRUCK CAMPER
Sam E. McCrea, 1140 W. Alondra (Space 41),
Compton, Calif. 90220
Filed Aug. 2, 1965, Ser. No. 476,319
4 Claims. (Cl. 280—163)

ABSTRACT OF THE DISCLOSURE

A removable step for use with a truck camper bumper that is formed with a pair of horizontally spaced apertures. The step comprises a generally rectangular plate having a pair of brackets secured to its opposite side portions. The brackets are each formed with a horizontal arm underlying the plate and an upstanding arm connected to the forward extremity of such horizontal arm. A hook is integrally formed at the upper portion of each of the upstanding arms and includes a portion projecting forwardly of the front surface of the respective upright arm, and further includes a portion turned upwardly at the front of the forwardly projecting portion, such upwardly turned portion being formed with a rearwardly facing lip for abutting the front surface of the bumper.

---

The present invention relates generally to the field of automotive vehicles and more particularly to a new and novel step that is removably securable to the rear bumper of a truck camper.

Conventional truck campers are provided with a rear door that is disposed at too great a height above the surface of the ground to permit ingress and egress to the camper. It is a major object of the present invention to provide a step which may be removably engaged with the rear bumper of a truck camper so as to permit persons to easily enter and exit from the rear door of a truck camper.

Another object of the present invention is to provide a removable step of the aforedescribed nature which is readily secured to and detached from a truck camper bumper without requiring the use of tools.

An additional object of the present invention is to provide a removable step for a truck camper having no moving parts and being simple in design and rugged of construction whereby it may afford a long and trouble-free service life.

Yet another object of the present invention is to provide a removable step for a truck camper which is economical of construction.

A more particular object of the present invention is to provide a removable step for use with a truck camper bumper that is formed with a pair of horizontally spaced apertures, such step including a generally rectangular plate and a pair of brackets secured to the opposite side portions of the plate, with each of such brackets being formed with a hook that is removably insertable within the bumper apertures.

These and other objects and advantages of the present invention will become apparent from the following detailed description, when taken in conjunction with the appended drawings wherein:

FIGURE 1 is a broken perspective view showing a preferred form of removable step secured to the rear bumper of a truck camper in accordance with the present invention;

FIGURE 2 is a side elevational view of said removable step showing such step attached to said bumper, with the latter appearing in section in this figure;

FIGURE 3 is a top plan view of said removable step;

FIGURE 4 is a vertical sectional view taken on line 4—4 of FIGURE 3; and

FIGURE 5 is a broken side view showing said step being secured to a bumper.

Referring to the drawings, a preferred form of step S embodying the present invention is shown attached to the rear bumper B of a truck camper C. The step S includes a plate 10, to the opposite sides of which are rigidly affixed a pair of like brackets, generally designated 12 and 14. Each of the brackets 12 and 14 is provided at its front portion with a hook 16 that is removably insertable within one of a pair of horizontally aligned apertures 18 and 20 formed in the bumper B. As indicated in FIGURE 1, mounting of the step S on the bumper B permits easy access to the rear door 22 of the camper C.

More particularly, the plate 10 is generally rectangular in configuration and the upper surface thereof is preferably knurled, as indicated at 22, to provide a roughened non-skid surface. This feature reduces the danger of slipping and falling on the part of persons entering and leaving the truck camper C. The brackets 12 and 14 are of identical construction, each such bracket including a horizontal arm 24 that extends from the front portion to the rear portion of the plate 10. Arms 24 are located slightly inwardly of the outer sides of the plate 10. The brackets also include an upstanding arm 26 integrally formed at the front of the horizontal arm 24. The upper portion of each of the upstanding arms 26 is integrally formed with the aforementioned hooks 16.

Each hook 16 includes an upwardly and forwardly curved frontal surface 28, the upper end of which terminates in a rearwardly extending horizontal surface 30. The rear end of the horizontal surface 30 terminates in a downwardly extending lip 32 that extends above the upper extremity of bumper apertures 18 and 20 when the hooks 16 are inserted therein. The lower end of the lip 32 intersects a rearwardly extending horizontal surface 34. As indicated in FIGURE 2, the vertical distance between the lower rear portion of the curved surface 28 and the horizontal surface 34 should be slightly less than the height of the apertures 18 and 20. It will also be apparent from this figure that the lip 32 is spaced forwardly of the rear end of curved surface 28 a distance equal to approximately the depth of the rear wall 40 of bumper B.

Referring again to FIGURE 1 and also to FIGURE 2, the midportion of the body of bumper B is formed with a forwardly extending cut-out portion or recess 42, the lower end of which is defined by a horizontal wall 44. Preferably, the dimensions of the step S will be so selected that the upper surface of the plate 10 is generally in the same horizontal plane as the upper surface of the bottom wall 44 when the step is mounted on the bumper. With this arrangement the area of the plate 10 will be increased by the area of the bottom plate 44 so as to facilitate ingress and egress to the camper C.

In the use of the aforedescribed step S, during travel of the camper C, the step S will be stowed at any convenient point inside or outside the camper C. Because of its compact nature the step S requires little storage space. When the camper has reached its destination, the hooks 16 of the brackets 12 and 14 will be pivotally inserted within the apertures 18 and 20 in the manner shown in FIGURE 5, i.e. the rear end of the step S will be elevated whereby the hooks 16 may be inserted forwardly through the apertures 18 and 20. Thereafter, the step S will be pivoted downwardly in a counter-clockwise direction until the plate 10 is disposed in its horizontal position shown in FIGURES 1 through 4. At this time the front surfaces of the vertical bracket legs 26 will abut the rear surface of the rear wall 40 of bumper B. Additionally, the lip 32 of each hook 16 will abut the forward surface of bumper wall 40. The brackets 12 and 14, and hence the plate 10, will in this manner be rigidly locked against downward movement relative to the bumper B. The greater the weight imposed upon the plate 10 the greater the locking action restraining movement of the bracket hook 16 out of the apertures 12 and 14.

It will be apparent to those skilled in the art that various modifications and changes may be made with respect to the foregoing detailed description, without departing from the spirit of the present invention or the scope of the following claims.

I claim:

1. A removable step for use with a truck camper bumper that is formed with a pair of horizontally spaced apertures, said step comprising:
   a generally rectangular plate;
   a pair of brackets secured to the opposite side portions of said plate, each of said brackets having a horizontal arm extending from the front to the rear of said plate, and an upstanding arm formed at the front of said horizontal arm; and
   a hook integrally formed at the upper portion of each of said upstanding arms, each of said hooks being formed with a portion projecting forwardly of the front surface of a respective one of said upstanding arms for insertion within one of said apertures, and further being formed with an upturned portion having a rearwardly facing lip for abutting the front surface of said bumper, whereby the abutment of said rearwardly facing lips of said upturned portions, in combination with the abutment of the forwardly facing surfaces of said upright arms, limit downward movement of said rectangular plate, said hooks being removed from said apertures by lifting the rear end of said plate upwardly and forwardly relative to said bumper.

2. A removable step as set forth in claim 1 wherein each said hook includes an upwardly and forwardly curved frontal surface that terminates at its upper end in a rearwardly extending horizontal surface, the rear end of the latter terminating in a downwardly extending lip that extends above the upper extremities of said bumper apertures when said hooks are inserted therein, and the lower end of said lip intersecting a second rearwardly extending surface, the vertical distance between the lower portion of said frontal surface and said second rearwardly extending surface being slightly less than the height of said apertures.

3. A combination removable step and truck camper bumper, comprising:
   a bumper body formed at its midportion with a forwardly extending recess, the lower end of said recess being defined by a horizontal wall, said bumper body also including a vertical rear wall formed with a pair of horizontally aligned apertures that are located outwardly of said recess;
   a generally rectangular plate;
   a pair of like brackets secured to the opposite side portions of said plate, each of said brackets having a horizontal arm extending from the front to the rear of said plate, and an upstanding arm formed at the front of said horizontal arm; and
   a hook integrally formed at the upper portion of each of said upstanding arms, each of said hooks being inserted forwardly through one of said apertures to retain the upstanding arms of said brackets against the rear surface of said bumper, with said hooks being removed from said apertures by lifting the rear end of said plate upwardly and forwardly relative to said bumper, and said plate being disposed in substantially the same horizontal plane as the horizontal wall of said bumper when said hooks are engaged with said bumper apertures.

4. The combination of claim 3 wherein each said hook includes an upwardly and forwardly curved frontal surface that terminates at its upper end in a rearwardly extending horizontal surface, the rear end of the latter terminating in a downwardly extending lip that extends above the upper extremities of said bumper apertures when said hooks are inserted therein, and the lower end of said lip intersecting a second rearwardly extending surface, the vertical distance between the lower portion of said frontal surface and said second rearwardly extending surface being slightly less than the height of said aperture.

References Cited

UNITED STATES PATENTS

| 1,206,203 | 11/1916 | Brockway | 182—92 |
| 1,749,112 | 3/1930 | Russell | 293—69 |
| 2,324,507 | 7/1943 | Johnson | 280—166 |
| 2,545,139 | 3/1951 | Elfes | 280—163 |
| 2,859,050 | 11/1958 | Stonerock et al. | 293—69 |
| 3,137,516 | 6/1964 | Cline | 293—69 |

BENJAMIN HERSH, *Primary Examiner.*

L. D. MORRIS, *Assistant Examiner.*